United States Patent [19]

Wood et al.

[11] 4,426,254
[45] Jan. 17, 1984

[54] SOLUBILIZATION OF NONIONIC SURFACTANTS USEFUL IN WOOD PULP DERESINATION

[75] Inventors: Donald L. Wood; Judith E. Zweig, both of Houston, Tex.

[73] Assignee: Shell Oil Company, Houston, Tex.

[21] Appl. No.: 374,839

[22] Filed: May 5, 1982

[51] Int. Cl.$^3$ ............................................. D21C 9/08
[52] U.S. Cl. ........................................ 162/72; 162/76; 162/DIG. 3
[58] Field of Search ............... 162/72, 75, 76, DIG. 3, 162/DIG. 4; 8/127

[56] References Cited

U.S. PATENT DOCUMENTS 2,668,110  2/1954  Spencer et al. ................... 162/72
2,716,058  8/1955  Rapson et al. ................... 162/72
2,999,045  9/1961  Mitchell et al. .................. 162/72
4,063,886 12/1977  Powers et al. ..................... 8/127

FOREIGN PATENT DOCUMENTS 2164235  6/1973  Fed. Rep. of Germany ......... 8/127
50-48201  4/1975  Japan ........................ 162/DIG. 4

Primary Examiner—William F. Smith

[57] ABSTRACT

A process for extracting resin from wood pulp by contacting the pulp at elevated temperature with an aqueous medium comprising between about 2 and 15 percent by weight sodium hydroxide and between about 0.2 and 1.0% weight of an ethylene oxide condensation product, and also comprising in specified proportion one or more substances selected from the group consisting of a $C_{12}$ alpha-olefin sulfonate and a particular $C_{21}$ dicarboxylic acid. The sulfonate and dicarboxylic acid substantially enhance solubilization of the condensation product deresination agent in the highly polar aqueous medium.

5 Claims, No Drawings

SOLUBILIZATION OF NONIONIC SURFACTANTS USEFUL IN WOOD PULP DERESINATION

BACKGROUND OF THE INVENTION

This invention relates to discoveries concerning the solubilization of certain surfactant materials in highly polar aqueous media. More particularly, the present invention relates to application of these discoveries to provide improvement in processes which utilize nonionic surfactants in the removal of resin from wood pulps.

Conventional manufacture of purified cellulose from wood requires the separation from the wood of a variety of substances. Of particular interest to the present invention is the removal of substances collectively known to the art as resins, and specifically including such materials as resin acids (Abietic and pimaric types), saturated and unsaturated fatty acids and fatty acid esters, sterols and hydrocarbons (terpenes).

Resin removal provides general advantage to conventional wood pulp processes by alleviating problems such as foaming in process streams and fouling of process equipment. More importantly, effective separation of resin from the pulp is essential for the production of high grade cellulose as is used, for instance, in the manufacture of cellophane, viscose rayon, carboxymethyl cellulose, cellulose acetate, and cellulose nitrate.

It is recognized in the prior art that deresination of wood pulps can be very effectively accomplished through treatment with aqueous surfactant solutions which aid in the extraction of the resins from the cellulose fibers. The nature of the surfactants employed is recognized as important to successful performance in deresination. For instance, U.S. Pat. No. 2,716,058 describes a process for the treatment of pulps with solutions of, as surfactant deresination agents, ethylene oxide condensation products of alcohols, acids, and natural oils. The use of such ethylene oxide condensation products is said to be necessary for the effective extraction of resin from the wood pulps—other wetting or detergent or emulsifying agents are reported to be substantially less effective in achieving the desired degree of deresination. The use for pulp deresination of nonionic surfactants, such as these ethylene oxide condensation products, is also reported by M. Domsjo in Swedish Pat. No. 150,651, by W. H. Rapson in Pulp Paper Mag. Can., vol. 57, No, 10, pp. 147–151 (1956), by K. Kitao in Wood Research (Japan) No. 17, p. 31–42 (1957), and by D. B. Mutton in Transactions of the American Pulp and Paper Inst., vol. 41, No. 11, pp. 632–642 (1958).

Although the surface active properties of the ethylene oxide condensation products have been shown to be well suited to resin extraction from wood, certain solubility considerations limit opportunities for their application to this service. Specifically, the nonionic ethylene oxide condensation products have only slight solubility in the caustic media and under the elevated temperatures at which processing steps associated with deresination are most often conducted. For instance, the deresination surfactant is commonly contacted with the pulp in either the digester or the caustic extraction bleach stage of the pulp process. In either case, high concentrations of sodium hydroxide (as well as lesser concentrations of other inorganics) and elevated temperatures are encountered in the surfactant-containing aqueous media at the point of surfactant addition and/or in downstream process stages. Because of solubility considerations, deresination operations are limited with respect to the quantity and the type of ethylene oxide condensation products which can be applied as well as to other processing conditions such as maximum caustic content and maximum temperature in the deresination solution.

It is an object of this invention to provide for enhanced solubility of the nonionic ethylene oxide condensation products in highly caustic aqueous media, and to thereby realize an improved process for wood pulp deresination which takes advantage of the surfactant properties of nonionic ethylene oxide condensation products, but which does not suffer the disadvantages or limitations associated with solubility properties of these products under desired deresination conditions.

SUMMARY OF THE INVENTION

It has now been found that the solubility of ethylene oxide condensation products in an aqueous medium having a relatively high content of polar solute is notably improved by incorporating into the medium a small amount of at least one of two particular solubilizing agents. This discovery may be of general advantage in a variety of services (e.g., processes for the sizing of textiles, the mercerization of cotton fabric, and the enhanced recovery of oil) to which nonionic surfactants are applied in aqueous solutions also containing high levels of caustic or other strongly polar solutes such as sodium chloride. Of specific advantage is the application of this discovery to wood pulp treatment processes which apply ethylene oxide condensation products to pulp deresination. In this context, the invention is summarily expressed as an improvement upon the conventional process which comprises steps for contacting wood pulp at elevated temperature with an aqueous medium comprising in combination between about 2 and 15 percent by weight sodium hydroxide and between about 0.2 and 1.0 percent by weight of an ethylene oxide condensation product, both of said percentages calculated on weight of the aqueous medium. This improvement is provided by incorporating into the aqueous medium a solubilizing agent selected from the group consisting of a $C_{12}$ alphaolefin sulfonate, a $C_{21}$ dicarboxylic acid, and mixtures thereof, in a weight ratio of the ethylene oxide condensation product to the solubilizing agent that is between about 9 to 1 and 1 to 1.

DESCRIPTION OF THE PREFERRED EMBODIMENTS

The present invention is applicable to any wood pulp manufacturing process in which pulp is in contact with an aqueous medium containing between about 0.2 and 1.0 percent by weight of one or more ethylene oxide condensation products and between about 2 and 15 percent by weight of sodium hydroxide. Such processes are most often applied to the treatment of pulps from hardwoods, for example, oak, gum, birch, poplar, and maple, which typically have an average resin content between about 0.1 and 2.0 percent by weight.

The ethylene oxide condensation products suitable for purposes of the invention and the processing steps through which they are applied are the same products and processing steps heretofore applied in pulp deresination service. Exemplification of these products is provided by the aforementioned prior art on surfactant deresination, the disclosures of which on this point are incorporated herein by reference. Preference may be stated, both on the basis of commercial availability and expense, and from the standpoint of deresination performance, for the products of ethylene oxide addition to alcohols, particularly alkanols and alkyl-substituted phenols. As examples of the alkyl-substituted phenols, mention may be made of compounds in which the aromatic ring carries a single alkyl substituent of about 6 to 12 carbon atoms. Condensation products of ethylene oxide with octylphenols and nonylphenols are particularly preferred. Preferred alkanols include monohydroxyl substituted alkanols of from about 8 to 18, more preferably 9 to 16, carbon atoms. Considered most preferred are the condensation products of ethylene oxide with primary $C_9$ to $C_{16}$ alkanols having predominently linear (straight-chain) carbon structure.

The suitable ethylene oxide condensation products have in common an average number of ethylene oxide adducts per molecule that is preferably in the range from about 6 to 16, more preferably the range from about 8 to 14, and most preferably in the range from about 9 to 13. Addition of a plurality of ethylene oxide units to compounds, e.g., alcohols, having an active hydrogen is accomplished by methods well known to the art, for instance by reaction at elevated temperature in the presence of a basic catalyst, such as alkali and alkaline earth metal oxides and hydroxides.

The specified solubilizing agent functions for purposes of the invention to increase the solubility of ethylene oxide condensation products in aqueous solutions of high caustic content, particularly at elevated temperature. For most satisfactory solubilization performance over a range of caustic concentrations from about 2 to 15 percent by weight (%w) and for temperatures in the range of about 35° to 95° C., it has been found critical to use, as the solubilizing agent, a $C_{12}$ alpha-olefin sulfonate or a particular $C_{21}$ dicarboxylic acid as herein specified. Mixtures of these two materials also suitable. A wide variety of other materials have been tested and found to be substantially less effective for purposes of the invention than the two solubilizing agents specified for the invention.

As is common practice in the art, alpha-olefin sulfonates suitable for purposes of this invention are defined in terms of the olefins from which they are derived (via sulfonation reaction) and, more particularly, in terms of the carbon number and molecular structure of these olefins. These olefins necessarily have a carbon number of twelve and are alpha (terminal) olefins. Olefin sulfonates derived from olefins of other carbon number or from olefins of internal double bond position may be present, as they have no adverse influence upon the performance of the $C_{12}$ alpha-olefin sulfonates. However, that quantity of olefin sulfonate specified for the invention is made up only of the sulfonated $C_{12}$ alpha-olefins. The $C_{12}$ alpha-olefins may be either linear or branched. Typical commercially available mixtures of linear and branched olefins are very suitable, although preference may be stated for use of olefin sulfonates derived from olefins of which at least about 50% have linear (straight carbon chain) structure, while olefins of substantially linear structure (i.e., olefin mixtures in which at least about 70% of the molecules are linear) are more preferred and olefins in which at least about 85% of the olefins are linear are considered most preferred. Olefins of such description are manufactured, for instance, via the cracking of paraffin wax and by the oligomerization of ethylene utilizing Ziegler catalysts, and are available from a number of sources. The olefins are converted into olefin sulfonates by conventional procedures, most commonly by reaction with sulfur trioxide ($SO_3$) or compounds or complexes which contain or yield $SO_3$. Sulfonates of $C_{12}$ alpha-olefins are well-known commercial products.

The $C_{21}$ dicarboxylic acid suitable for use as solubilizing agent in the process of the invention has the formula

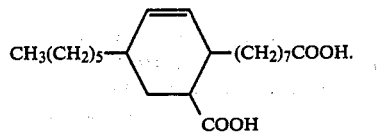

This compound is suitably prepared by the Diels-Alder reaction between acrylic acid and linoleic acid. Commercial production has been accomplished from tall oil fatty acids, which contain substantial amounts of the linoleic acid.

The quantity of solubilizing agent incorporated into the aqueous caustic deresination media for the purposes of the invention is that necessary to provide a weight ratio of ethylene oxide condensation product to solubilizing agent that is in the range from about 9 to 1 to about 1 to 1. For most applications of the invention, a weight ratio of between about 4 to 1 and 1.5 to 1 will be satisfactory. However, the optimal amount of solubilizing agent introduced for a given process will depend upon temperature(s) and caustic concentration(s) in the aqueous media with which the pulp is contacted and upon the particular ethylene oxide condensation product present. As a rule, increases in the quantity of solubilizing agent introduced result in effective solubilization at higher process temperatures.

Incorporating either the $C_{12}$ alpha-olefin sulfonate or the $C_{21}$ dicarboxylic acid into the aqueous deresination media in accordance with the invention does not have significant adverse influence upon the resin extraction capability of the ethylene oxide condensation products. This is typically the case even though the ethylene oxide condensation product concentration is decreased to offset the amount of solubilizing agent introduced.

Contact between pulp and an aqueous media containing ethylene oxide condensation products and sodium hydroxide may take place in one or more of several stages of the pulping process. For instance, ethylene oxide condensation products are, under typical conventional deresination practices, added to the digestion and/or bleach stages. Such contact also commonly occurs in process stages immediately downstream of digestion and bleach, e.g., stages in which pulp is washed to accomplish its separation from inorganics, ethylene oxide condensation products, and resin. Because there may be a series of contacts between the pulp and aqueous solutions containing different amounts of ethylene oxide condensation products and caustic and having different temperatures a suitable solubilizing agent is necessarily effective over a range of such conditions.

Introduction of the solubilizing agent may be suitably made in any manner which results in the presence of the agent in the caustic and ethylene oxide condensation product-containing aqueous media where solubilizing effects are desired. Preferably, the solubilizing agent is introduced to the same aqueous media to which an ethylene oxide condensation product is added for deresination purposes. Most preferably, the solubilizing agent is introduced into the aqueous media together with the ethylene oxide condensation product. However, introduction of the agent to the media of one or more other stages of the process, e.g., washing or other downstream processing steps, is suitable to alleviate problems which occur during these stages.

The invention is further illustrated by the following examples.

EXAMPLE 1

The process steps of the invention are exemplified by the practice of deresination in the digester of common conventional alkaline pulping. In the digestion stage of the pulping process, pulp is contacted with an aqueous medium, known as white liquor, for solubilization and removal of lignin. The white liquor is an aqueous solution formed from about 80 grams/liter (g/l) of sodium hydroxide, somewhat lesser amounts of sodium sulfide and sodium carbonate, and substantially lesser amounts of other inorganics. Such a white liquor may have an effective content of 100 g/l or more of sodium hydroxide, since the sodium sulfide present is largely converted to sodium hydroxide and sodium hydrosulfide by hydrolysis in the aqueous solution. For deresination purposes about 4 grams per liter (g/l) of the products of the condensation of an average of about 9 to 13 moles of ethylene oxide with one mole of linear primary alkanols in the 10 to 15 carbon number range are added to the digester white liquor. After contact with the ethylene oxide condensation product contained in white liquor in the digester, the pulp is washed to remove inorganics, deresination surfactant, and solubilized lignin and resin in one or more washing steps. In the course of the washing, i.e., a countercurrent wash with water or a dilute aqueous caustic solution, the pulp contacts a series of diluted white-liquor solutions. Temperature in the digestion and washing stages varies from about 250°–340° F. and 100°–200° F. respectively.

For purposes of the invention, $C_{12}$ alpha-olefin sulfonate (or the specified $C_{21}$ dicarboxylic acid, or a mixture of the two agents) is incorporated into one more of the sodium hydroxide containing solutions of the digestion and washing stages to aid in solubilization of the ethylene oxide condensation products. Incorporation of the solubilizing agent is particularly exemplified by its direct addition to the digester liquor. (Alternatively, or additionally, the agent is introduced into the water or dilute aqueous caustic solution utilized for pulp washing.) In this example, introduction of the $C_{12}$ alpha-olefin sulfonate into the digester in a quantity of about 2 g/l of digester liquid, provides a weight ratio of ethylene oxide condensation products to solubilizing agent of about 2 to 1.

EXAMPLE 2

This example illustrates the effectiveness of the $C_{12}$ alpha-olefin sulfonate solubilizing agent for ethylene oxide condensation products in several typical caustic containing processing media.

Solubility of the condensation products was tested both with and without the introduction of the solubilizing agent. For these tests, an aqueous white liquor solution was prepared having 80 g/l sodium hydroxide, 36 g/l sodium sulfide, and 40 g/l sodium carbonate. (By titration with hydrochloric acid, this solution was found to have an effective NaOH content of about 110 g/l). Different dilutions with water were also made from this white liquor to simulate the variety of solutions, having different sodium hydroxide content, with which pulp is typically in contact, for instance, during pulp digestion and wash steps.

For comparative tests of the solubility characteristics of the ethylene oxide condensation products in the absence of a solubilizing agent and not in accordance with the invention, determination was made of the cloud point of mixtures of 0.5% w of the condensation product in the prepared white liquor or a dilution of the white liquor. Cloud point of such a mixture is visually determined as the temperature at which the mixture turns from a clear solution to a cloudy suspension upon heating. Table 1 illustrates the relatively low cloud points (in °C.) observed for several ethylene oxide condensation products, having the following designations:

| designation | condensation product of: |
|---|---|
| A | an average of 12 moles of ethylene oxide with a mixture of $C_{12}$ to $C_{15}$ linear primary alkanols. |
| B | an average of 12 moles of ethylene oxide with a mixture of $C_9$ to $C_{11}$ linear primary alkanols. |
| C | an average of 9 moles of ethylene oxide with a mixture of $C_{11}$ to $C_{14}$ linear secondary alkanols. |
| D | an average of 12 moles of ethylene oxide with a mixture of $C_{11}$ to $C_{14}$ linear secondary alkanols. |
| E | an average of 9.5 moles of ethylene oxide with nonylphenol. |

TABLE 1

| ethylene oxide condensation product | g/l effective NaOH | | | | |
|---|---|---|---|---|---|
| | 20 | 40 | 75 | 95 | 110 |
| A | 74° C. | 52° C. | 17° C. | <10° C. | <10° C. |
| B | 79 | 59 | 25 | <10 | <10 |
| C | 49 | 33 | <10 | <10 | <10 |
| D | 67 | 50 | 15 | <10 | <10 |
| E | 34 | 18 | <10 | <10 | <10 |

Similar tests were made, simulating the process of the invention, to illustrate the influence upon ethylene oxide condensation product solubility of the introduction of a solubilizing agent in accordance with the invention. Cloud points were determined for mixtures containing 0.35% w of ethylene oxide condensation product and 0.15% w of the $C_{12}$ alpha-olefin sulfonate ($C_{12}$ AOS) solubilizing agent in the white liquor or a dilution of the white liquor. (Total deresination additives, i.e., ethylene oxide condensation product plus solubilizing agent, remained at the 0.5% w level.) Results of these tests are reported in Table 2, together with relevant comparative data from Table 1 obtained without the benefit of solubilizing agent.

TABLE 2

| ethylene oxide condensation product and concentration | solubilizing agent and concentration | g/l effective NaOH | | | | |
|---|---|---|---|---|---|---|
| | | 20 | 40 | 75 | 95 | 110 |
| *A, 0.5% w | none | 74° C. | 52° C. | 17° C. | <10° C. | <10° C. |
| A, 0.35% w | $C_{12}$AOS, 0.15% w | >100 | >100 | 57 | 27 | 12 |
| *B, 0.5% w | none | 79 | 59 | 25 | <10 | <10 |
| B, 0.35% w | $C_{12}$AOS, 0.15% w | >100 | 98 | 48 | 24 | 14 |
| *C, 0.5% w | none | 49 | 33 | <10 | <10 | <10 |
| C, 0.35% w | $C_{12}$AOS, 0.15% w | — | — | 39 | 11 | <10 |
| *D, 0.5% w | none | 67 | 50 | 15 | <10 | <10 |
| D, 0.35% w | $C_{12}$AOS, 0.15% w | >100 | 72 | 53 | 20 | <10 |

*Comparative tests, not in accordance with the invention.

EXAMPLE 3

A number of other materials were tested as potential solubilizing agents for an ethylene oxide condensation product in white liquor solutions. Preliminary screening tests showed that one group of substances tested were essentially insoluble in the white liquor diluted to 75 g/l effective NaOH. This group included sodium lauryl sulfate, a mixture of $C_{11}$ and $C_{12}$ secondary alcohol sulfates, the sulfate ester of the condensation product of an average of 2 moles of ethylene oxide with a mixture of $C_{11}$ and $C_{12}$ secondary alkanols, the sulfonate of the condensation product of an average of 2 moles of ethylene oxide with alkylphenols, and $C_{18}$ and $C_{20}$ internal-olefin sulfonates.

Another group of potential solubilizing agents was found to be soluble in white liquor solutions and to solubilize ethylene oxide condensation products, although to a substantially lesser extent than the invention, illustrated through comparison to a $C_{12}$ alpha-olefin sulfonate ($C_{12}$AOS) an equal mixture (by weight) of $C_{12}$ alpha-olefin sulfonate and $C_{14}$ alpha olefin sulfonate (indicated as 50% $C_{12}$ AOS/50% $C_{14}$AOS) or the specified $C_{21}$ dicarboxylic acid ($C_{21}$DCA). The solubilization performance of this group was tested under the general procedures of Example 2. In each case, cloud point (in °C.) was determined for a mixture containing 0.35% w of the addition product of an average of 12 moles of ethylene oxide to a mixture of $C_{12}$ to $C_{15}$ linear primary alkanols (the product designated A above) and 0.15% w of the agent to be tested. Results are reported in Table 3, for tests of agents designated as follows:

| designation | solubilization agent |
|---|---|
| a | $C_{10}$ alpha-olefin sulfonate |
| b | $C_{14}$ alpha-olefin sulfonate |
| c | 50/50 mixture (by weight) of $C_{14}$ alpha-olefin sulfonate and $C_{16}$ alpha-olefin sulfonate |
| d | $C_{14}$ internal olefin sulfonate |
| e | $C_{18}$ internal olefin sulfonate |
| f | phosphate ester of the condensation product of an average of 2.5 moles ethylene oxide with a mixture of $C_9$ to $C_{11}$ linear primary alkanols |
| g | phosphate ester of the condensation product of an average of 3 moles ethylene oxide with a mixture of $C_{12}$ to $C_{15}$ linear primary alkanols |
| h | phosphate ester of the condensation product of an average of 4 moles ethylene oxide with branched $C_{10}$ alkanols |
| i | phosphate ester of the condensation product of an average of 4.5 moles of ethylene oxide with linear alkanols having an average carbon number of 9.4 |
| j | phosphate ester of the condensation product of an average of 6 moles ethylene oxide with a mixture of $C_9$ to $C_{11}$ primary linear alkanols |
| k | phosphate ester of the condensation product of an average of 9 moles ethylene oxide with a mixture of branched alkanols having an average carbon number of 12.5 |
| l | phosphate ester of the condensation product of an average of 12 moles ethylene oxide with a mixture of $C_{12}$ to $C_{15}$ primary linear alkanols |
| m | phosphate ester of an alkylphenol ethoxylate |
| n | lauric acid |
| o | lauryldimethylamine oxide |
| p | sodium xylene sulfonate |

TABLE 3

| solubilizing agent | weight ratio ethylene oxide condensation product to solubilizing agent | g/l effective NaOH | | | | | | |
|---|---|---|---|---|---|---|---|---|
| | | 20 | 30 | 40 | 60 | 75 | 95 | 110 |
| *$C_{12}$AOS | 2.3:1 | >100° C. | | >100° C. | | 57° C. | 27° C. | 12° C. |
| " | 4:1 | | 94° C. | | 67° C. | | | |
| *50% $C_{12}$AOS/50% $C_{14}$AOS | 2.3** | >100 | | >100 | | 47 | 31 | <10 |
| *$C_{21}$DCA | 2.3:1 | | | | | 50 | | |
| a | 2.3:1 | | | | | 42 | | |
| b | 4:1 | | 87 | | 42 | | | |
| c | 2.3:1 | | 90 | | 54 | | | |
| " | 4:1 | | 90 | | 45 | | | |
| d | 4:1 | | 69 | | 39 | | | |
| e | 4:1 | | 73 | | 46 | | | |
| f | 2.3:1 | | | | | 15 | | |
| g | 2.3:1 | | | | | 29 | | |
| " | 1.9:1 | | | | | 31 | | |
| h | 2.3:1 | | | | | 47 | 27 | <10 |
| " | 1.9:1 | | | | | 52 | 32 | 12 |

TABLE 3-continued

| solubilizing agent | weight ratio ethylene oxide condensation product to solubilizing agent | g/l effective NaOH | | | | | | |
|---|---|---|---|---|---|---|---|---|
| | | 20 | 30 | 40 | 60 | 75 | 95 | 110 |
| i | 2.3:1 | | 83 | | 62 | 49 | <10 | <10 |
| " | 4:1 | | 80 | | 44 | 37 | | |
| " | 1.5:1 | | | | | 50 | | |
| j * | 2.3:1 | | | 71 | | 41 | 22 | 17 |
| k | 2:3:1 | | | | | 54 | 13 | <10 |
| l | 2.3:1 | | | 74 | | 32 | 20 | |
| m | 2.3:1 | | | | | 46 | 41 | <10 |
| n | 4:1 | | 82 | | 54 | | <10 | |
| o | 2.3:1 | | | 74 | | 47 | <10 | <10 |
| " | 4:1 | | | 70 | | 28 | <10 | <10 |
| p | 4:1 | | 63 | | 35 | | | |

*Solubilizing agents specified for use in the invention.
**Weight ratio with reference to the $C_{12}AOS$ only is 4.6:1.

EXAMPLE 4

This example indicates the effect on ethylene oxide condensation product solubility in white liquor (or dilutions thereof) of varying levels of solubilizing agent introduced in accordance with the invention. Cloud points were measured for mixtures which each contained a total of 0.5% w of ethylene oxide condensation product plus solubilizing agent, but which differed in the weight ratios of the condensation product and solubilizing agent. In each case, the condensation product was that formed by addition of 12 moles of ethylene oxide to a mixture of $C_{12}$ to $C_{15}$ linear primary alkanols (the product designated A hereinabove). The $C_{21}$ dicarboxylic acid ($C_{21}$ DCA) was derived from tall oil fatty acids. Results are summarized in Table 4.

Comparison is also provided in Table 4 of the results of tests to determine cloud points of mixtures in which the phosphate ester of the condensation product of an average of 9 moles of ethylene oxide with a mixture of alkanols having an average carbon number of 12.5 is substituted for the solubilizing agent specified for the invention. Although, as shown in Table 3, this phosphate ester (there designated "k") has relatively good performance under one set of conditions, Table 4 shows that the solubilizing function of this material is inherently limited and cannot be increased by increasing its concentration in the caustic media, as can both the $C_{12}AOS$ and $C_{21}DCA$.

TABLE 4

| concentration of ethylene oxide condensation product | solubilizing agent and concentration | weight ratio condensation product to solubilizing agent | g/l effective NaOH | |
|---|---|---|---|---|
| | | | 75 | 95 |
| 0.4% w | $C_{12}AOS$, 0.1% w | 4:1 | 38° C. | <10 |
| 0.375 | $C_{12}AOS$, 0.125 | 3:1 | 38 | <10 |
| 0.35 | $C_{12}AOS$, 0.15 | 2.33:1 | 57 | 28 |
| 0.325 | $C_{12}AOS$, 0.175 | 1.86:1 | 68 | 40 |
| 0.30 | $C_{12}AOS$, 0.20 | 1.5:1 | 75 | 58 |
| 0.275 | $C_{12}AOS$, 0.225 | 1.22:1 | 83 | |
| 0.25 | $C_{12}AOS$, 0.25 | 1:1 | 91 | |
| 0.375 | $C_{21}DCA$, 0.125 | 3:1 | 42 | |
| 0.35 | $C_{21}DCA$, 0.15 | 2.33:1 | 50 | |
| 0.325 | $C_{21}DCA$, 0.175 | 1.86:1 | 65 | |
| 0.30 | $C_{21}DCA$, 0.20 | 1.5:1 | 76 | |
| 0.375 | k, 0.125 | 3:1 | 35 | |
| 0.350 | k, 0.15 | 2.33:1 | 54 | 13 |
| 0.325 | k, 0.175 | 1.86:1 | 52 | |
| 0.30 | k, 0.2 | 1.5:1 | 49 | | k designates a phosphate ester of the condensation product of an average of 9 moles ethylene oxide with a mixture of branched alkanols having an average carbon number of 12.5.

We claim as our invention:

1. In a process for the manufacture of wood pulp which comprises treating a wood pulp by contact at elevated temperature with an aqueous medium containing between about 2 and 15 percent by weight sodium hydroxide and between about 0.2 and 1.0 percent by weight of an ethylene oxide condensation product deresination agent, the improvement which comprises incorporating into the aqueous medium a solubilizing agent which is a $C_{12}$ alpha-olefin sulfonate, with the provision that the weight ratio of said ethylene oxide condensation product in the aqueous medium to said solubilizing agent is between about 9 to 1 and about 1 to 1.

2. The process of claim 1, wherein the solubilizing agent is the sulfonate of substantially linear $C_{12}$ alpha-olefins.

3. The process of claim 1, or claim 2, wherein the aqueous medium contains at least about 5 percent by weight sodium hydroxide.

4. The process of claim 3, wherein the ethylene oxide condensation product is the product of the addition of an average of between about 8 and 14 moles of ethylene oxide to one mole of one or more alkanols in the $C_9$ to $C_{16}$ carbon number range.

5. The process of claim 4, wherein the weight ratio of the ethylene oxide condensation product to the solubilizing agent is between about 4 to 1 and about 1.5 to 1.

* * * * *